United States Patent
Preston et al.

(10) Patent No.: US 6,937,563 B2
(45) Date of Patent: Aug. 30, 2005

(54) HOMING AND CONTROLLING IP TELEPHONES

(75) Inventors: Andrew C. Preston, Morrisville, NC (US); Steve J. McKinnon, Cary, NC (US); Steve S. Yang, Raleigh, NC (US); Joshua Me, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 802 days.

(21) Appl. No.: 09/802,195

(22) Filed: Mar. 8, 2001

(65) Prior Publication Data

US 2002/0126654 A1 Sep. 12, 2002

(51) Int. Cl.[7] .............................................. G01R 31/08
(52) U.S. Cl. ..................................... 370/230; 370/431
(58) Field of Search ............................ 370/252, 351–3, 370/338, 359, 400–411, 419, 463, 469, 466–7, 230, 431, 433, 437–9; 455/66, 556; 709/200–203

(56) References Cited

U.S. PATENT DOCUMENTS 6,584,490 B1 * 6/2003 Schuster et al. ............. 709/200
2002/0041590 A1 * 4/2002 Donovan ..................... 370/352
2002/0103898 A1 * 8/2002 Moyer et al. ................ 709/224

OTHER PUBLICATIONS

Handley, M et al., SIP: Session Initiation Protocol RFC 2543, IEFT, Mar. 1999.*

* cited by examiner

*Primary Examiner*—David Vincent
(74) *Attorney, Agent, or Firm*—Withrow & Terranova, PLLC

(57) ABSTRACT

The present invention relates to providing server functionality in a dedicated module or a specially configured packet-switched telephone. The server function is preferably adapted to control the configuration and operation of a plurality of packet-switched telephones configured to operate as clients of the server function. The server function may control specific operation of the packet-switched telephones as well as support communications between the packet-switched telephones and other telephony devices over the packet-switched network. The server function may operate to facilitate communications with the supported packets-switched telephones using a first protocol and with the other telephony devices using a second protocol. The second protocol is preferably the Session Initiation Protocol (SIP).

45 Claims, 5 Drawing Sheets

US 6,937,563 B2

HOMING AND CONTROLLING IP TELEPHONES

FIELD OF THE INVENTION

The present invention is related to packet-switched telephony, and in particular, to controlling communications for multiple telephony devices from a common telephony device.

BACKGROUND OF THE INVENTION

The convergence of circuit-switched networks, such as the public switched telephone network (PSTN), and packet-switched networks, such as the Internet, has made it possible to transmit voice and data across disparate networks. Currently, packet-switched telephony has evolved to allow packet-switched-based telephones, referred to in general as Internet Protocol (IP) telephones, to provide all of the services and features of traditional circuit-based telephones in addition to supporting innumerable web-based applications and services.

Currently, IP telephones either require sophisticated, self-contained control systems or rely on a dedicated server application running on a network-based server. For the self-contained IP telephones, the significant amount of hardware and software required to allow the telephone to be self-supportive renders it cost prohibitive, especially for business applications requiring a large number of telephones.

Although more cost effective, IP telephones acting as clients and relying on a network server for operation tend to limit the user's ability to take advantage of additional features and configurability afforded to IP telephones. In particular, a terminal proxy server, which is relatively removed from the associated IP telephones, will typically serve a large number of telephones and provide each of those telephones with a common configuration. Currently, the ability of users to configure an individual telephone or group of telephones to accommodate specific needs in an efficient and user-friendly manner does not exist. These telephones either require configuration through the telephone interface itself or by a dedicated administrator capable of interacting with the server applications running on the terminal proxy server.

As such, there is a need for a cost effective IP telephony solution for applications requiring multiple IP telephones. Further, there is a need for a way to efficiently configure and customize the telephones on an individual or group basis to take advantage of the extended functionality provided by packet-switched communications and web-based applications.

SUMMARY OF THE INVENTION

The present invention relates to providing server functionality in a dedicated module or a specially configured packet-switched telephone. The server function is preferably adapted to control the configuration and operation of a plurality of packet-switched telephones configured to operate as clients of the server function. The server function may control specific operation of the packet-switched telephones as well as support communications between the packet-switched telephones and other telephony devices over the packet-switched network. The server function may operate to facilitate communications with the supported packet-switched telephones using a first protocol and with the other telephony devices using a second protocol. The second protocol is preferably the Session Initiation Protocol (SIP).

A web server function may also be provided to allow web-based configuration of the packet-switched telephones and provisioning of communication functions or services. Providing a web-based interface allows administrators or users of the packet-switched telephones to configure the packet-switched telephones or provision communication capabilities using a web browser as a user interface. A web browser interface provides a more user-friendly interface than using the limited buttons and display traditionally available on telephones.

The present invention moves the functionality of a terminal proxy server to the edge of a traditional packet-switched network and localizes the homing and controlling of basic, packet-switched telephones in a local communication device. Providing such functionality in a local device facilitates better local control, and providing a web-based interface provides an efficient and user-friendly interface for administrators of and users in a work group.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of the application illustrate several aspects of the invention, and together with the description serve to explain the principles of the invention.

DETAILED DESCRIPTION OF THE PREFERRED EMBODIMENTS

The present invention provides for a server function, associated with an Internet Protocol (IP) telephone that is capable of facilitating communications for additional IP telephones to form a telephone work group. The server function may be implemented in a separate module interfacing with an IP telephone or integrated into a special IP telephone. The telephone work group is preferably self-sufficient and capable of communicating over an IP network using the necessary protocols to facilitate telephony communications with devices in the IP network as well as those supported in associated networks. The IP telephones in the work group do not require the services of a traditional terminal proxy server and will facilitate ready configuration by the users within the work group or an administrator of the work group.

Upon reading the following description in light of the accompanying drawing figures, those skilled in the art will understand the concepts of the invention and will recognize applications of these concepts not particularly addressed herein. It should be understood that these concepts and applications fall within the scope of this disclosure and the accompanying claims. The embodiments set forth below represent the necessary information to enable those skilled in the art to practice the invention and illustrate the best mode of practicing the invention.

Figure 1:
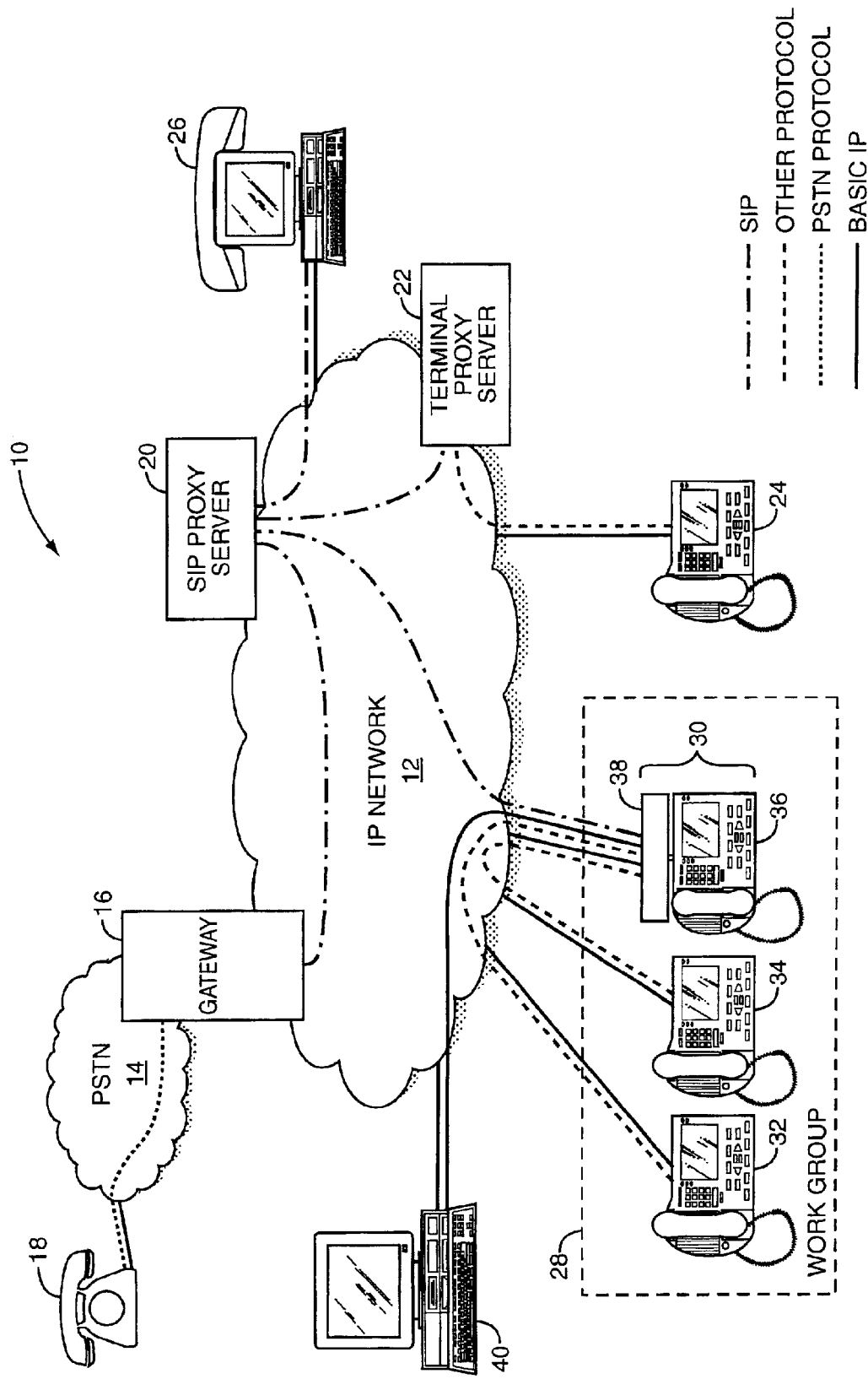
FIG. 1 depicts an exemplary communications environment containing aspects constructed according to the present invention.

With reference to FIG. 1, a communication environment, generally referenced as 10, is shown centered about a packet-switched network, such as an IP network 12. The IP network 12 may be coupled to disparate networks, such as the PSTN 14, via a gateway 16 to facilitate communications with circuit-switched telephony devices 18. The gateway 16 will facilitate protocol conversions and data manipulations necessary to establish media flows or call processing between the networks in traditional fashion.

Packet-switched telephony communications throughout the IP network 12 are preferably conducted using the Session Initiation Protocol (SIP). SIP provides the ability to establish sessions between endpoints over the IP network 12. The endpoints represent devices communicating over the IP network 12 using SIP. Once established, sessions can exchange media capabilities and set up multiple media paths between the endpoints, depending on the capabilities of those endpoints.

A SIP endpoint is typically referred to as a user agent (UA). Generally, user agents register their ability to receive calls with a SIP proxy by sending REGISTER messages to the SIP proxy. The REGISTER message informs the SIP proxy of the SIP uniform resource locator (URL) that identifies the user agent to the IP network 12. The REGISTER message also contains information about how to reach the specific user agent over the IP network 12. For example, the information may include the IP address and port facilitating communications. In addition, the REGISTER message provides a user agent's desired contact information, such as a telephone number or email address.

Typically, when one user agent needs to establish a call to another user agent, an INVITE message is sent to the SIP proxy specifying the targeted user agent in the "TO" header. Identification of a user agent takes the form of a SIP URL, such as <USERNAME>@<DOMAIN>. The USERNAME is usually unique within the name space of the specified domain. The SIP proxy will use the SIP URL in the "TO" header of the message to see if the user agent has registered with the SIP proxy server.

If the targeted user agent has registered with the SIP proxy, the SIP proxy will forward an INVITE message directly to that user agent. The user agent will typically respond with a 200 OK message, and a session between the two agents will be established per the message exchange required in the SIP specification. Capabilities are passed between the two endpoints as parameters embedded within the session setup messages, including INVITE, 200 OK, and ACK. Media capabilities can also be exchanged using the SIP INFO message. Capabilities are typically described using the Session Description Protocol (SDP).

Once endpoints are in an active session with each other and they know about each other's capabilities, they can begin to exchange the specified media content. Further information pertaining to SIP may be found in the Internet Engineering Task Force's RFC 2543, which is incorporated herein by reference. An exemplary call flow scenario incorporating SIP is described below following a description of the various components forming the communication environment.

Continuing to reference FIG. 1, a SIP proxy server 20 is associated with the IP network 12 to facilitate SIP-based communications with various SIP-compatible devices. These devices may include a dedicated terminal proxy server 22, which facilitates operation of an IP telephone 24 acting as a client of the terminal proxy server 22. The terminal proxy server 22 may support any number of clients in traditional fashion, as described above. The client-server based configuration of the terminal proxy server 22 and IP telephone 24 represents existing IP telephony solutions that are often unduly expensive for a small number of IP telephones and difficult to customize and configure. Personal computer (PC) 26 may also be configured as a SIP-based telephony device, also known as a SIP soft phone. As depicted, PC 26 is configured with the necessary hardware and software to facilitate SIP services without requiring a traditional terminal proxy server, such as terminal proxy server 22. However, SIP communications may require the services of the SIP proxy server 20.

In contrast to the stand-alone SIP devices provided by PC 26 or the terminal proxy server configuration, the present invention may provide a work group 28 of IP telephony devices 32, 34, 36 that are capable of cooperating with one another and facilitating communications and services over the IP network 12 under the control of a smart telephone configuration 30. As depicted, basic IP telephones 32 and 34 may be homed to and have operation features controlled by the smart telephone configuration 30. Preferably, the smart telephone configuration 30 is formed by basic IP telephone 36 operating in association with a server module 38.

The server module 38 is capable of interacting with IP telephones 32, 34, and 36 using a first protocol and facilitating communications with or control of these telephones 32, 34, 36 using a second protocol via the IP network 12. Typically, the first protocol is a protocol running over IP that is configured to facilitate communications and control of the IP telephones 32, 34, 36. In the present example, the second protocol is SIP. The server module 38 provides the SIP UA functionality. It eliminates the need for a network-based terminal proxy server and is preferably also configured to act as a web server to facilitate configuration of any of the IP telephones 32, 34, 36 via a web browser running on personal computer 40. The server module 38 provides the terminal proxy server functionality at the edge of the IP network 12 instead of centralizing it in a formal, terminal proxy server.

In operation, the IP telephones 32, 34, 36 will communicate over IP network 12 with the server module 38 using a first protocol, such as Nortel's proprietary UNISTIM protocol. Depending on network configuration, the server module 38 may have a unique IP address or share a common address with the associated IP telephone 36. Communications between the server module 38 and other SIP-compatible devices will use SIP. Preferably, SIP communications use the SIP proxy server 20. The SIP proxy server 20 may communicate using SIP with PC 26, circuit-switched telephony device 18 via gateway 16, and IP telephone 24 via terminal proxy server 22. Notably, the terminal proxy server 22 may communicate with IP telephone 24 using UNISTIM or other protocol. A web browser running on PC 40 may be used to access the server module 38, which will preferably be able to run a web server application capable of configuring each of the IP telephones 32, 34, 36. Details of the web server operation and configuration of the IP telephones 32, 34, 36 are described in further detail below.

Figure 1A:
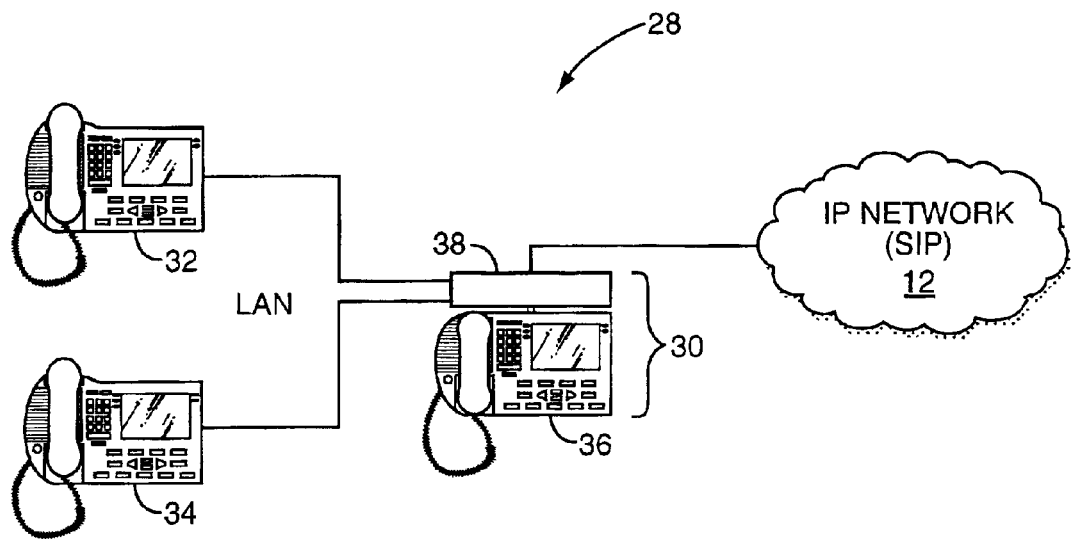
FIG. 1A is an exemplary configuration of a work group according to one embodiment of the present invention.
Figure 1B:
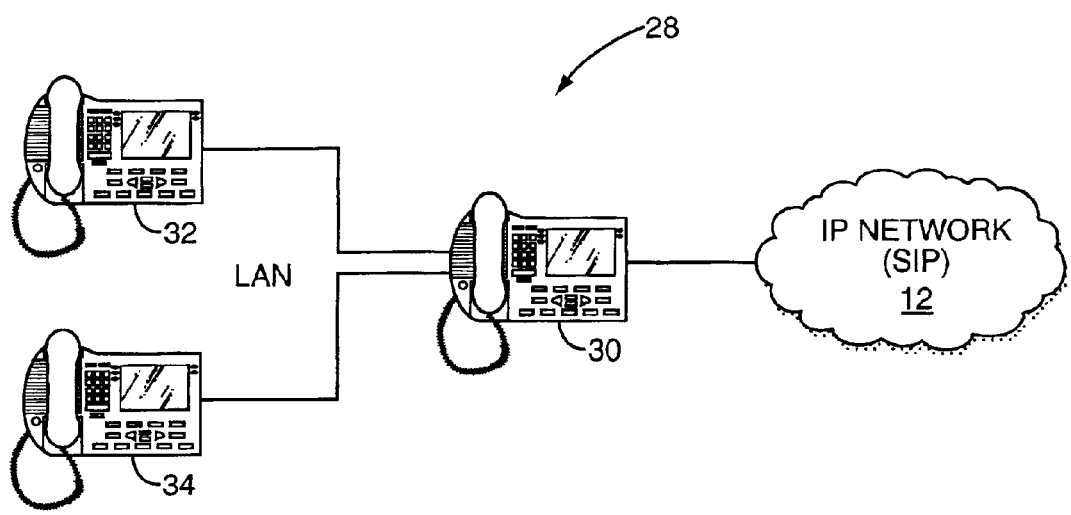
FIG. 1B is an exemplary configuration of a work group according to a second embodiment of the present invention.

With reference to FIGS. 1A and 1B, the smart telephone configuration 30 may include a separate server module 38 configured to interface with a basic IP telephone 36. Additional IP telephones, such as IP telephones 32 and 34, may connect to the server module 38 through a local area network (LAN) or the like. The interface between the server module 38 and associated IP telephone 36 may be proprietary or facilitated over the local area network. As such, IP telephone 36 may have a dedicated port, docking arrangement, or like interface to communicate with the server module 38.

Alternatively, the smart telephone configuration 30 may include a specially configured IP telephone having the functionality of server module 38 integrated therein. As such, the additional IP telephones 32 and 34 may connect directly to the smart telephone configuration 30, or may connect via a hub, switch, router, server, or like network device. Those skilled in the art will recognize the various degrees of integration and network configurations capable of facilitating the concepts of the present invention.

Figure 2:
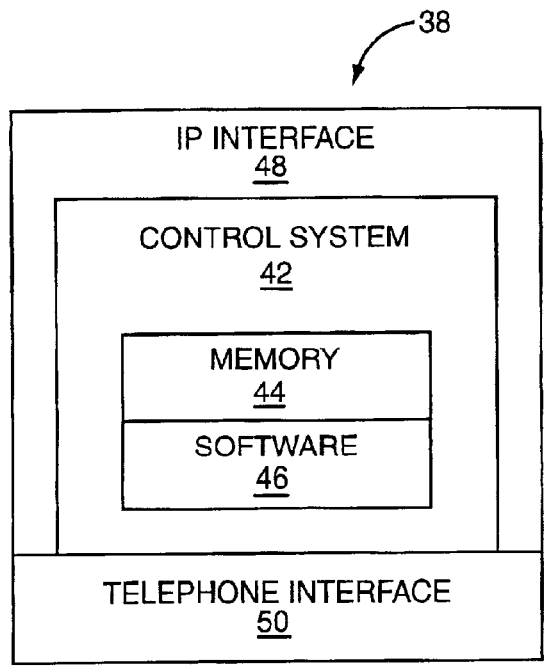
FIG. 2 is a block representation of a server module constructed according to the present invention.

An exemplary configuration for the server module 38 is depicted in FIG. 2. The server module 38 will preferably include a control system 42 having sufficient memory 44 to store the requisite software 46 and data required for operation. The control system 42 may also be associated with an IP interface 48 to provide access to the IP network 12. The IP interface 48 may be a standard network interface connection. The control system 42 may also include a dedicated telephone interface 50 configured to interface with IP telephone 36 to form the smart telephone configuration 30. Depending on the configuration, the control system 42 may only require the IP interface 48 if communications between the server module 38 and the IP telephone 36 are routed over a local area network or the IP network 12. Alternatively, a dedicated interface will typically incorporate the telephone interface 50.

Figure 3:
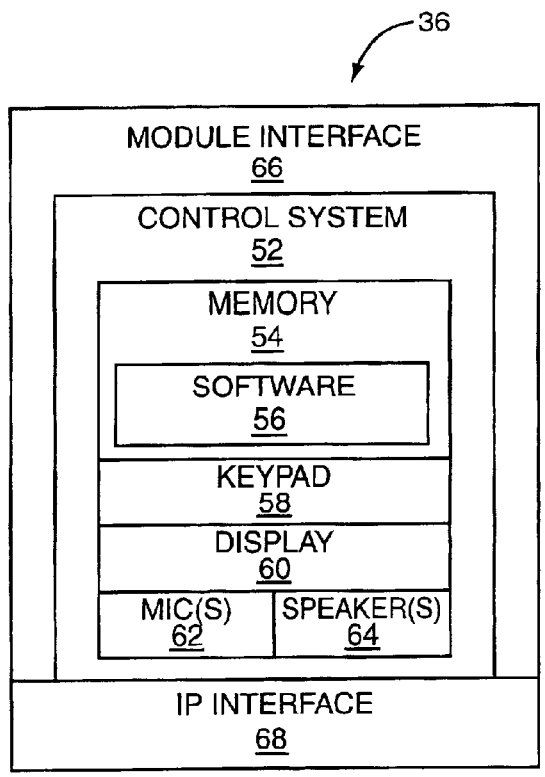
FIG. 3 is a block representation of an IP telephone constructed according to a preferred embodiment of the present invention.

FIG. 3 illustrates an exemplary IP telephone 36 capable of either interfacing with the server module 38 or integrating the functionality of the server module 38 therein. The IP telephone 36 will typically include a control system 52 having sufficient memory 54 to store the necessary software 56 and data required for operation. The control system 52 will also be associated with a keypad 58, display 60, and one or more microphones 62 and speakers 64 to facilitate voice telephony via hands-free operation or a traditional headset. The control system 52 will also include a module interface 66 for interfacing with the server module 38 in nonintegrated embodiments. Further, the control system 52 will include an IP interface 68 for interfacing with the local area network or the IP network 12.

Figure 4:
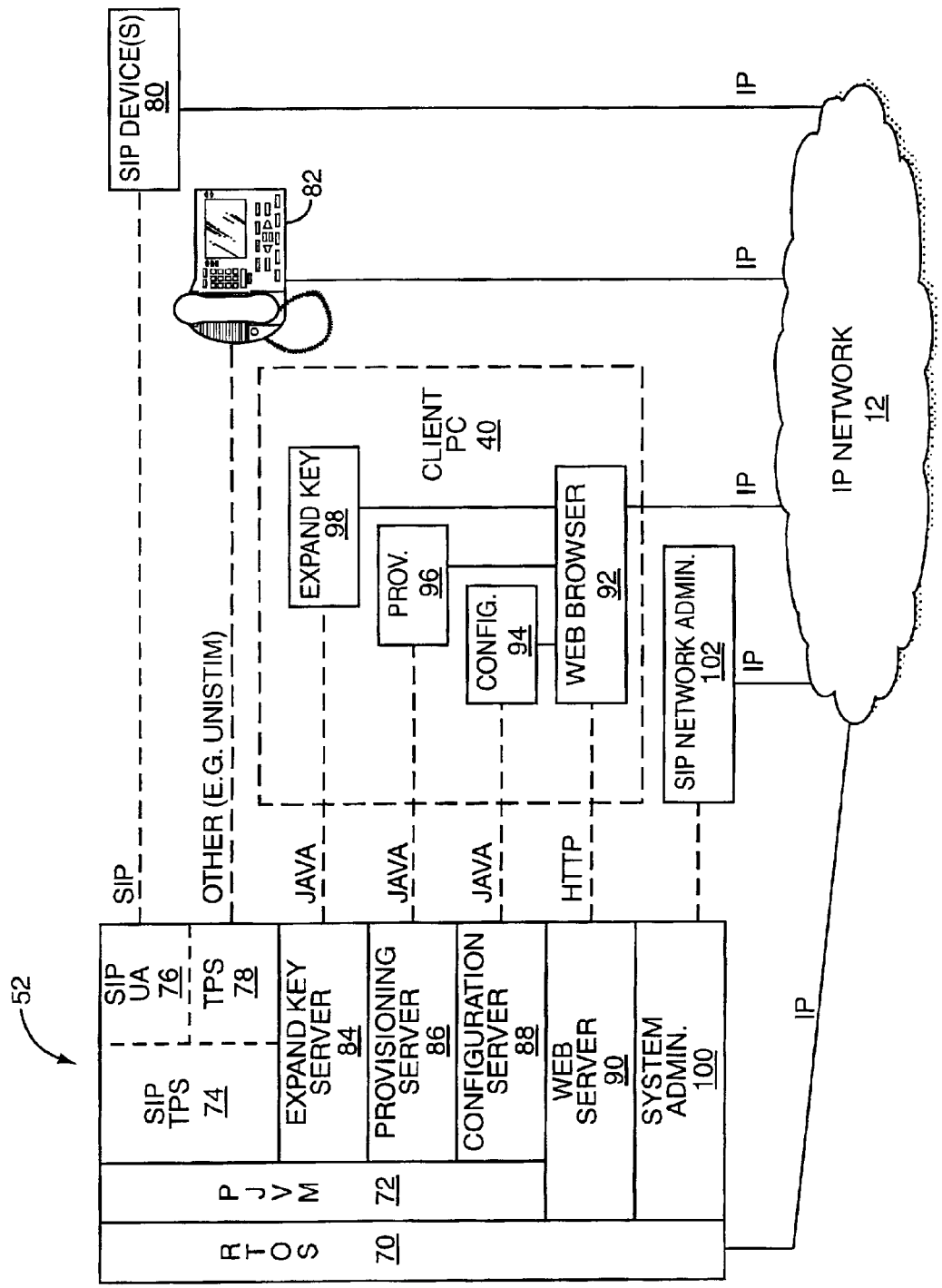
FIG. 4 depicts exemplary control architecture or a server module constructed according to a preferred embodiment of the present invention.

The functional architecture of the server module 38 or an integrated smart telephone configuration 30 is shown in FIG. 4. The architecture will include a real-time operating system (RTOS) 70, preferably supporting a Personal Java Virtual Machine (PJVM) 72. The PJVM 72 will support a SIP terminal proxy server (TPS) function 74, which provides a SIP user agent 76 and a basic, terminal proxy server function 78. The SIP user agent 76 will communicate using SIP over the IP network 12 with various SIP devices 80, wherein the terminal proxy server function 78 will communicate using, typically, a non-SIP protocol, with supported IP telephones 82 (such as IP telephones 32, 34, 36 as shown in FIGS. 1, 1A and 1B).

Expand key server function 84, provisioning server function 86, and configuration server function 88 are supported by the basic web server function 90. The web server function 90 is configured to allow a web browser 92 on a remote device, typically a PC or workstation of the associated user of the IP telephone 32, 34, 36, to access the configuration, provisioning, and expand key server features 88, 86, and 84 using configuration, provisioning, and expand key objects 94, 96, and 98 supported by the web browser 92. As depicted, these features are preferably Java-based and communicate using the Hypertext Transfer Protocol (HTTP) when the web browser 92 accesses web pages supported by the web server 90. A system administration feature 100 may be directly accessed over an IP network via a SIP network administrator 102 using Telnet or an appropriate file transfer protocol.

The expand key server function 84 provides the ability to view, add, change, and delete information concerning the IP telephone 32, 34, 36 via the web browser 92 of the individual user's PC 40. The web browser interface gives the user the ability to see information relating to the provisioning and configuration of the respective IP telephone through a user-friendly web interface. The web interface allows the user to type in information using a regular keyboard using a traditional display, which provides a larger, more easily viewed display than that normally provided on the IP telephone 32, 34, 36. The expand key feature may facilitate logging in to the system to gain authentication to use the system, provide a list of callers for maintaining a directory of numbers that have called select terminals, or provide the registration or configuration status of the login of any IP telephone 32, 34, 36 at any given time. Those skilled in the art will recognize many additional IP telephone features that are more easily viewed or configured via a typical PC interface instead of using the smaller visual interface provided by IP telephones.

The provisioning and configuration server functions 86, 88 allow users to register new IP telephones and change provisioning for existing IP telephones in the work group 28. In particular, the configuration feature provides a graphical user interface to select and choose system preferences and properties, preferably using a Windows-based interface. For example, the application type, SIP proxy server addresses, software and firmware versions, host IP addresses, port numbers, and related configuration data may be selected or modified. In essence, virtually all of the communication and system parameters, preferences, and settings are configurable, at group level or user level, by using a web browser 92 accessing the web server feature 90.

The preferences and settings may also include call processing configurations wherein the various telephone features, such as hold, transfer, call forwarding, and call waiting, may be provisioned. For example, call forwarding may be provisioned and configured using the web browser interface, such that an administrator may enable the call forwarding and a user may access the web server feature 90 to activate the call forwarding feature and identify the user, IP address, or telephone number to which calls are forwarded. In addition to traditional telephony features, web-based services may be provisioned and configured for any of the IP telephones via the web server feature 90. For example, a stock ticker may be configured to provide stock quotes for select companies on the telephone display throughout the day. Those skilled in the art will recognize the innumerable features and functions that one would typically exercise in a normal desktop computer or web accessible hand-held device that may be implemented at the IP telephone 32, 34, 36. The present invention supports all such functionality, while allowing a user or the group administrator to initially configure the functionality through a traditional web page supported by the web server 90, which is accessible by traditional browsers.

Importantly, the web-based interface with the IP telephones 32, 34, 36 in the work group 28 is provided directly by the server module 38 or by an IP telephone configuration having the functionality of the server module 38. As noted, the server module 38 provides the local intelligence and services for the associated IP telephones 32, 34, 36 supported in the work group 28. Since the control in the work group 28 is provided within the work group 28, an administrative assistant can easily control the IP telephones 32, 34, 36 in the work group 28 without affecting or gaining access to a traditional terminal proxy server controlling all the telephones within a business. Further, the administrator and users can access the IP telephones 32, 34, 36 within the work group 28 in a user-friendly web-based environment.

Figure 5:
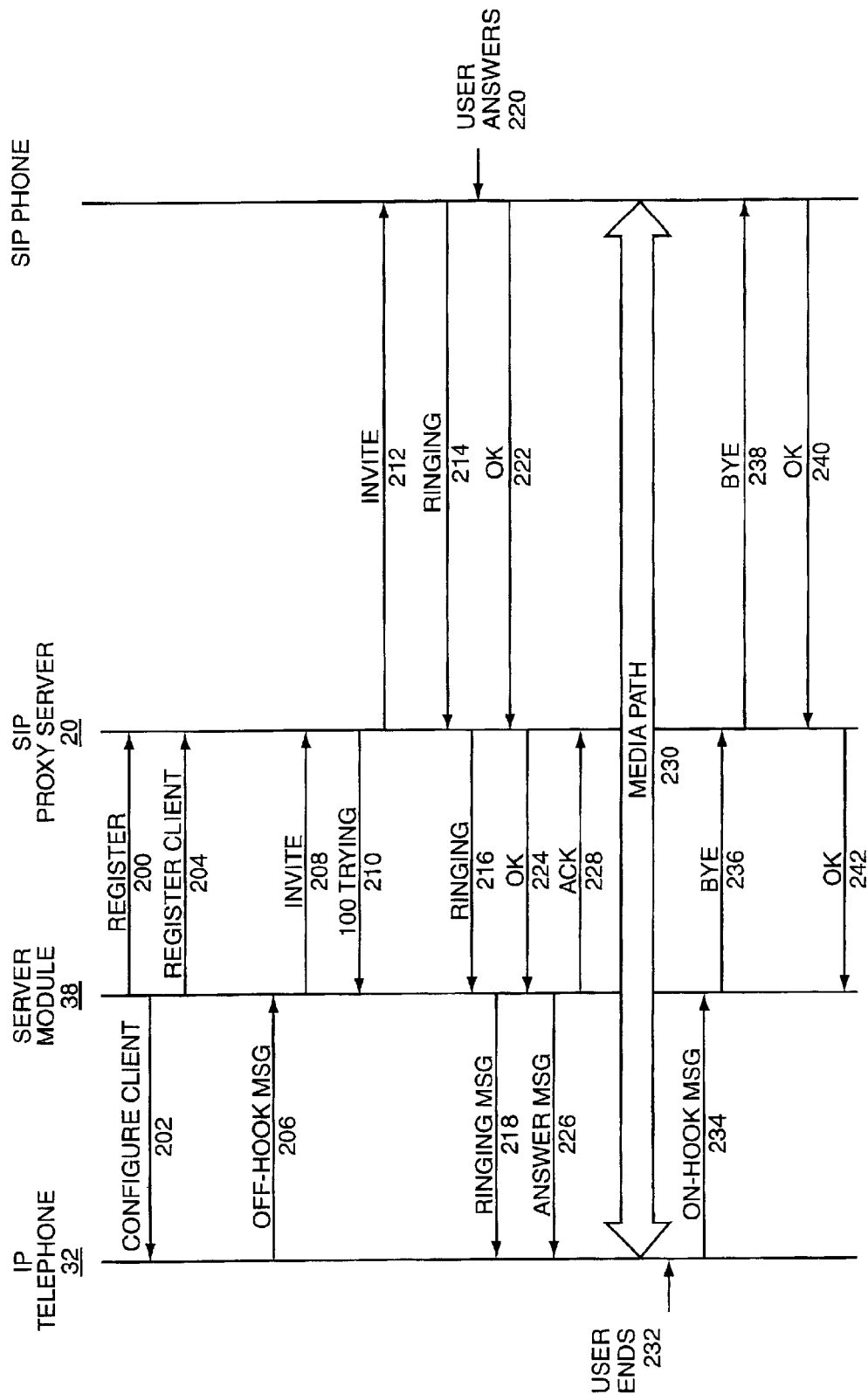
FIG. 5 is an exemplary call flow diagram for the preferred embodiment of the present invention.

Once the IP telephones 32, 34, 36 are configured, communications with the server module 38 are preferably facilitated using the UNISTIM protocol, whereas the server module 38 communicates with other SIP devices over the IP network 12 using SIP. FIG. 5 depicts an exemplary communication between an IP telephone 32 (client) supported by the server module 38 (server) in the work group 28. Initially, the server module 38 will register with the SIP proxy server 20 (step 200). The server module 38 will then configure the IP telephone 32 based on provisioning and configuration settings provided by an administrator through the web-based interface (step 202). The server module 38 may also register various aliases or additional information associated with the IP telephone 32 with the SIP proxy server 20 (step 204). For example, IP telephone 32 may include a traditional telephone number, IP address or email address to identify the terminal.

Assuming that the IP telephone 32 intends to initiate a telephone call to the SIP telephone, the IP telephone 32 will send an OFF-HOOK message to the server module 38 (step 206). The OFF-HOOK message is preferably provided in the UNISTIM protocol wherein the server module 38 will convert the OFF-HOOK message, which will typically include identifying information for the device being called, into a SIP INVITE message, which is sent to the SIP proxy server 20 (step 208). The SIP proxy server 20 will respond to the server module 38 with a 100 TRYING message (step 210) and forward the INVITE message to the SIP telephone being contacted (step 212). The SIP telephone will respond by sending a 180 RINGING message to the SIP proxy server 20 (step 214). The SIP proxy server 20 will forward the 180 RINGING message to the server module 38 (step 216), which will convert the message to the appropriate ringing message in the UNISTIM protocol and send the resultant message to the IP telephone 32 (step 218).

Assuming that the user of the SIP telephone answers the ringing telephone (step 220), the SIP telephone will send a 200 OK to the SIP proxy server 20 (step 222). The SIP proxy server 20 will forward the 200 OK to the server module 38 (step 224), which will provide an answer message to the IP telephone 32 (step 226) using the UNISTIM protocol. The server module 38 will then provide an acknowledgement (ACK) to the SIP proxy server 20 (step 228). At this point, the media path is established between the IP telephone 32 and the SIP telephone (step 230).

When the user ends the call (step 232), an "ON-HOOK" message is sent from the IP telephone 32 to the server module 38 (step 234). In response, the server module 38 will send a SIP BYE message (step 236) to the SIP proxy server 20, which will forward the BYE message to the SIP telephone (step 238). The SIP telephone will respond with a 200 OK (step 240) to the SIP proxy server 20, which will forward the 200 OK to the server module 38 to officially end the communication (step 242). Those skilled in the art will appreciate the details of SIP, and that the above call processing is merely provided to illustrate an exemplary call flow wherein either the server module 38 or a smart telephone configuration 30 is capable of supporting any number of IP telephones in the work group 28. An integrated smart telephone configuration 30 or a server module 38 is configured to provide the local intelligence and services for the associated IP telephones 32, 34 (and 36 in a nonintegrated embodiment) by emulating a terminal proxy server, which provides for operation of and communication with each of the supported IP telephones in the work group 28.

The present invention moves the concepts of terminal proxy servers to the edge of the IP network 12 by providing local work groups 28 having IP telephones 32, 34, and 36 homed into and controlled by the server module 38 associated with IP telephone 36 or integrated into a smart telephone configuration 30. Providing local intelligence and services eliminates the need for all the IP telephones in the work group 28 to be self-contained, and eliminates the need to network all IP telephones within a business to a centralized terminal proxy server in traditional fashion. As such, local administrators and users have more freedom to provision and configure the IP telephones in the work group 28. Further, by providing the server function in the server module 38 or in an integrated smart telephone configuration 30, the local administrator and users may configure individual ones or all of the IP telephones within the work group 28 using a user-friendly graphical user interface via a standard browser running on a personal computer or like device.

Those skilled in the art will recognize numerous modifications to and additional benefits provided by the present invention. These modifications and benefits are considered within the scope of the above disclosure and the claims that follow.

What is claimed is:

1. A module for facilitating operation of packet-switched telephones, the module comprising:
    a network interface for communicating over a network; and
    a control system operatively associated with said network interface and providing a server function adapted to control concurrent operation of a plurality of packet-switched telephones operating as clients of the server function and facilitate communications between the plurality of packet-switched telephones and other telephony devices using a first protocol for communications with the plurality of packet-switched telephones and a second protocol for communications with the other telephony devices, wherein the server function registers with a remote proxy server using the second protocol and the server function registers each of the plurality of packet-switched telephones with the remote proxy server using the second protocol such that each of the plurality of packet-switched telephones may operate concurrently.

2. The module of claim 1 further comprising a telephone interface associated with the control system and adapted to connect to one of the plurality of packet-switched telephones, the control system further adapted to interact with one of the plurality of packet-switched telephones via the telephone interface.

3. The module of claim 2 wherein the control system is further adapted to cooperate with the one of the plurality of packet-switched telephones to initially configure the one of the plurality of packet-switched telephones to work in conjunction with the module via the telephone interface.

4. The module of claim 3 wherein the control system is further adapted to facilitate telephony communications between the one of the plurality of packet-switched telephones and one of the other telephony devices via the network interface.

5. The module of claim 1 wherein the control system is adapted to provide and control operation features for the plurality of packet-switched telephones.

6. The module of claim 5 wherein the operation features define provisioned telephony functions for the plurality of packet-switched telephones.

7. The module of claim 5 wherein the operation features define configuration settings for the plurality of packet-switched telephones.

8. The module of claim 5 wherein the operation features control at least one of the group consisting of keys, displays, responses, and functions of the plurality of packet-switched telephones using the first protocol.

9. The module of claim 5 wherein the control system further provides a web server function adapted to provide network access to set the operation features of the plurality of packet-switched telephones using a web browser.

10. The module of claim 9 wherein the web server function provides at least one web page providing an interface for a user to set select ones of the operation features.

11. The module of claim 1 wherein the control system is further adapted to receive, using the first protocol, an OFF-HOOK message from one of the plurality of packet-switched telephones and generate a message to the remote proxy server including identifying information for a device being called by the one of the plurality of packet-switched telephones.

12. The module of claim 1 wherein the control system is further adapted to translate between the first and second protocols to facilitate communications between the plurality of packet-switched telephones and the other telephony devices.

13. The module of claim 1 wherein the second protocol is a Session Initiation Protocol.

14. A packet-switched telephone facilitating operation of other packet-switched telephones comprising:
 a microphone and speaker configuration providing an audible interface;
 a packet-switched network interface for communicating over a network; and
 a control system operatively associated with said network interface and the microphone and speaker configuration, the control system providing a server function adapted to control concurrent operation of a plurality of packet-switched telephones operating as clients of the server function and facilitate communications between the plurality of packet-switched telephones and other telephony devices using a first protocol for communications with the plurality of packet-switched telephones and a second protocol for communications with the other telephony devices, wherein the server function registers with a remote proxy server using the second protocol and the server function registers each of the plurality of packet-switched telephones with the remote proxy server using the second protocol such that each of the plurality of packet-switched telephones may operate concurrently.

15. The packet-switched telephone of claim 14 wherein the control system is further adapted to facilitate telephony communications between one of the plurality of packet-switched telephone and one of the other telephony devices via the packet-switched network interface.

16. The packet-switched telephone of claim 14 wherein the control system is adapted to provide and control operation features for the plurality of packet-switched telephones.

17. The packet-switched telephone of claim 16 wherein the operation features define provisioned telephony functions for the plurality of packet-switched telephones.

18. The packet-switched telephone of claim 16 wherein the operation features define configuration settings for the plurality of packet-switched telephones.

19. The packet-switched telephone of claim 16 wherein the operation features control at least one of the group consisting of keys, displays, responses, and functions of the plurality of packet-switched telephones using the first protocol.

20. The packet-switched telephone of claim 16 wherein the control system further provides a web server function adapted to provide network access to set the operation features of the plurality of packet-switched telephones using a web browser.

21. The packet-switched telephone of claim 20 wherein the web server function provides at least one web page providing an interface for a user to set select ones of the operation features.

22. The packet-switched telephone of claim 14 wherein the control system is further adapted to receive, using the first protocol, an OFF-HOOK message from one of the plurality of packet-switched telephones and generate a message to the remote proxy server including identifying information for a device being called by the one of the plurality of packet-switched telephones.

23. The packet-switched telephone of claim 14 wherein the control system is further adapted to translate between the first and second protocols to facilitate communications between the plurality of packet-switched telephones and the other telephony devices.

24. The packet-switched telephone of claim 14 wherein the second protocol is a Session Initiation Protocol.

25. A method of controlling packet-switched telephones comprising:
 providing a server function in association with a first packet-switched telephone;
 configuring the first packet-switched telephone and a second packet-switched telephone as clients of the server function;
 facilitating communications between a plurality of packet-switched telephones and other telephony devices with the server function using a first protocol for communications with the plurality of packet-switched telephones and a second protocol for communications with the other telephony devices;
 registering the server function with a remote proxy server using the second protocol;
 controlling operation of the first and second packet-switched telephones using the server function at least in part by registering the first and second packet-switched telephones with the remote proxy sever using the second protocol such that the first and second packet-switched telephones may operate concurrently.

26. The method of claim 25 further comprising providing the server function in a module and associating the module with the first packet-switched telephone.

27. The method of claim 25 wherein the server function is integrated into the first packet-switched telephone.

28. The method of claim 25 further comprising:
providing a web server to provide a web page configured to receive settings for operation features defining operation of one of the first or second packet-switched telephones;
receiving input to set operation features for the one of the first or second packet switched-telephone via the web server; and
setting the operation features of the first or second packet-switched telephone based on the input.

29. A packet-switched telephony system comprising:
a plurality of packet-switched telephones communicating over a packet-switched network and configured to operate concurrently as clients of a server function; and
a module associated with one of the plurality of packet-switched telephones comprising:
a network interface for communicating over a network; and
a control system operatively associated with said network interface and providing the server function adapted to control concurrent operation of the plurality of packet-switched telephones and facilitate communications between the plurality of packet-switched telephones and other telephony devices using a first protocol for communications with the plurality of packet-switched telephones and a second protocol for communications with the other telephony devices, wherein the server function registers with a remote proxy server using the second protocol and the server function registers each of the plurality of packet-switched telephones with the remote proxy server using the second protocol such that each of the plurality of packet-switched telephones may operate concurrently.

30. A packet-switched telephony system comprising:
a plurality of first packet-switched telephones communicating over a packet-switched network and configured to operate concurrently as clients of a server function; and
a second packet-switched telephone comprising:
a microphone and speaker configuration providing an audible interface;
a packet-switched network interface for communicating over a network; and
a control system operatively associated with said network interface and the microphone and speaker configuration, the control system providing the server function adapted to control concurrent operation of the plurality of first packet-switched telephones operating as clients of the server function and facilitate communications between the plurality of first packet-switched telephones and other telephony devices using a first protocol for communications with the plurality of first packet-switched telephones and a second protocol for communications with the other telephony devices, wherein the server function registers with a remote proxy server using the second protocol and the server function registers each of the plurality of packet-switched telephones with the remote proxy server using the second protocol such that each of the plurality of packet-switched telephones may operate concurrently.

31. A computer readable medium including software for facilitating operation of a group of packet-switched telephones, the software comprising instructions for a computer to provide:
a server function adapted to:
control concurrent operation of a plurality of packet-switched telephones operating as clients of the server function;
facilitate communications between the plurality of packet-switched telephones and other telephony devices using a first protocol for communications with the plurality of packet-switched telephones and a second protocol for communications with the other telephony devices,
register the server function with a remote proxy server using the second protocol; and
register each of the plurality of packet-switched telephones with the remote proxy server using the second protocol such that each of the plurality of packet-switched telephones may operate concurrently,
wherein the server function is adapted to provide and control operation features for the plurality of packet-switched telephones; and
a web server function adapted to provide network access to set the operation features of the plurality of packet-switched telephones using a web browser.

32. The computer readable medium of claim 31 wherein the software is adapted to instruct a control system of a module connected to one of the plurality of packet-switched telephones.

33. The computer readable medium of claim 31 wherein the software is adapted to instruct a control system of one of the plurality of packet-switched telephones.

34. The computer readable medium of claim 31 further comprising instructions adapted to cooperate with one of the plurality of packet-switched telephones to initially configure the one of the plurality of packet-switched telephones to work in conjunction with the module via a telephone interface.

35. The computer readable medium of claim 31 wherein the operation features define provisioned telephony functions for the plurality of packet-switched telephones.

36. The computer readable medium of claim 31 wherein the operation features define configuration settings for the plurality of packet-switched telephones.

37. The computer readable medium of claim 31 wherein the operation features control at least one of the group consisting of keys, displays, responses, and functions of the plurality of packet-switched telephones using the first protocol.

38. The computer readable medium of claim 31 comprising further instructions to enable the web server function to provide at least one web page providing an interface for a user to set select ones of the operation features.

39. The computer readable medium of claim 31 comprising further instructions to receive, using the first protocol, an OFF-HOOK message from one of the plurality of packet-switched telephones and generate a message to the remote proxy server including identifying information for a device being called by the one of the plurality of packet-switched telephones.

40. The computer readable medium of claim 31 comprising further instructions to translate between the first and second protocols to facilitate communications between the plurality of packet-switched telephones and the other telephony devices.

41. The module of claim 31 wherein the second protocol is a Session Initiation Protocol.

42. A system for controlling packet-switched telephones comprising:
- means for providing a server function in association with a first packet-switched telephone;
- means for configuring the first packet-switched telephone and a second packet-switched telephone as clients of the server function;
- means for controlling concurrent operation of the first and second packet-switched telephones using the server function;
- means for facilitating communications between a plurality of packet-switched telephones and other telephony devices with the server function using a first protocol for communications with the plurality of packet-switched telephones and a second protocol for communications with the other telephony devices;
- means for registering the server function with a remote proxy server using the second protocol; and
- means for registering the first and second packet-switched telephones with the remote proxy sever using the second protocol such that the first and second packet-switched telephones may operate concurrently.

43. The system of claim 42 further comprising means for providing the server function in a module and associating the module with the first packet-switched telephone.

44. The system of claim 42 wherein the server function is integrated into the first packet-switched telephone.

45. The system of claim 42 further comprising:
- means for providing a web server to provide a web page configured to receive settings for operation features defining operation of one of the first or second packet-switched telephones;
- means for receiving input to set operation features for the one of the first or second packet switched-telephone via the web server; and
- means for setting the operation features of the first or second packet-switched telephone based on the input.

* * * * *